US005296879A

United States Patent [19]

Kagayama

[11] Patent Number: 5,296,879

[45] Date of Patent: Mar. 22, 1994

[54] IMAGE RECORDING APPARATUS HAVING DETACHABLE CARTRIDGE

[75] Inventor: Shigeru Kagayama, Owariasahi, Japan

[73] Assignee: Brother Kogyo Kabushiki Kaisha, Aichi, Japan

[21] Appl. No.: 855,837

[22] Filed: Mar. 23, 1992

Related U.S. Application Data

[63] Continuation-in-part of Ser. No. 726,907, Jul. 8, 1991, abandoned.

[30] Foreign Application Priority Data

Jul. 9, 1990 [JP] Japan ................................ 2-181083

[51] Int. Cl.[5] ............................................ G01D 15/06

[52] U.S. Cl. ................................ 346/160.1; 346/159

[58] Field of Search .................... 346/153.1, 154, 155, 346/160.1, 140 R, 159; 355/200, 245, 210, 261-264

[56] References Cited

U.S. PATENT DOCUMENTS

| | | | |
|---|---|---|---|
| 3,644,930 | 2/1972 | Stange et al. | 346/145 X |
| 4,598,993 | 7/1986 | Mizutani et al. | 355/211 |
| 4,951,070 | 8/1990 | Theodoulou et al. | 346/155 |
| 4,974,023 | 11/1990 | Aimoto et al. | 355/245 |
| 5,012,285 | 4/1991 | Oka et al. | 355/245 |
| 5,036,358 | 7/1991 | Yoshida | 355/245 |
| 5,038,159 | 8/1991 | Schmidlin et al. | 346/159 |
| 5,153,611 | 9/1992 | Kokado et al. | 346/140 R |
| 5,170,185 | 12/1992 | Takemura et al. | 346/140 R |

FOREIGN PATENT DOCUMENTS 0287568 11/1990 Japan .

*Primary Examiner*—A. T. Grimley
*Assistant Examiner*—Robert Beatty
*Attorney, Agent, or Firm*—Kane, Dalsimer, Sullivan, Kurucz, Levy, Eisele and Richard

[57] ABSTRACT

In an image recording apparatus, a toner supply roll electrostatically charges toner particles and supplies the charged toner particles to a brush roll. The toner particles supplied to the brush roll are introduced into a portion adjacent to apertures of a particle controller. The particle controller controls the toner particles to pass through the apertures in accordance with image signals applied to the particle controller so as to form a corresponding visible image on an image receiving medium. At least the toner supply roll, the brush roll and the particle controller are formed into a single unit. The single unit is detachably mounted in a housing of the image recording apparatus to be easily replaced with a new one.

39 Claims, 10 Drawing Sheets

IMAGE RECORDING APPARATUS HAVING DETACHABLE CARTRIDGE

This application is a continuation-in-part of application Ser. No. 07/726,907 filed Jul. 8, 1991 now abandoned. The present invention relates to an image recording apparatus for controlling densities of imaging material particle streams in accordance with image signals to thereby form visible images on image receiving medium.

BACKGROUND OF THE INVENTION

U.S. Pat. No. 3,689,935 discloses an image recording apparatus of a type provided with a toner supply portion, a back electrode and control electrodes with apertures. The toner supply portion supplies or carries charged toner particles to the control electrodes. The control electrodes are supplied with image signals to generate electric fields, degree of inclination of which is determined by the image signals. Therefore, amounts of the toner particles which are able to pass through the apertures of the control electrodes are changed according to the image signals. The back electrode also generates an electric field for further attracting toward the image receiving medium the charged toner particles which have passed the apertures of the control electrodes. Thus, amounts of the toner particles which have passed the control electrodes to reach the image receiving medium are changed according to the image signals applied to the control electrodes. Since densities of the toner particles attached on the image receiving medium correspond to the image signals, visible toner images corresponding to the image signals are formed on the image receiving medium.

In the image recording apparatus constructed as above, however, the toner particle supply portion, the control electrodes and the back electrode are fixedly mounted in the image recording apparatus at their respective portions. Therefore, in the case where either one or move of the elements get out of order, it is impossible for an operator to repair the elements or replace them with new ones. In addition, even if it is possible to replace the elements with the new ones, it takes a lot of time to arrange the elements and to regulate conditions thereof.

SUMMARY OF THE INVENTION

The present invention is achieved to overcome the above-noted defects, and an object of the present invention is to provide an image recording apparatus in which the elements such as the imaging material particle supply portion, the control electrodes and the back electrode may be easily replaced with new ones and the conditions of them may be easily regulated.

This and other objects may be attained by providing an image recording apparatus for recording an image on an image receiving medium, comprising: storing means for storing toner particles; charging means for charging the toner particles stored in the storing means; a particle controller having at least one row of apertures through which the charged toner particles pass, the particle controller controlling a flow of the charged toner particles in the apertures; carrying means for carrying the charged toner particles toward the apertures; and a back electrode confronting the carrying means through the particle controller, the back electrode being spaced from the particle controller by a space enabling passage of the image receiving medium; wherein at least the charging means, the carrying means and the particle controller are formed in a unit.

According to the image recording apparatus as constructed above, at least the means for carrying or supplying the imaging material particles such as toner particles to the particle controller and the particle controller are accommodated in a single unit which is detachably mounted in the image recording apparatus. Therefore, in the case where either one or ones of the particle supply means and the particle controller get out of order, the operator may simply replace the unit member with a new one.

In the image recording apparatus of the invention, a particle reservoir cartridge may be detachably coupled with the single unit. In this case, when the particle reservoir cartridge is used up, only the particle reservoir cartridge may be replaced with a new one.

The back electrode may also be included in the single unit. In this case, the back electrode may be mounted in the single unit fixedly or detachably.

According to another aspect of the present invention, an image recording cartridge is provided for use in an image recording apparatus for recording an image on an image receiving medium, comprising: charging means for charging toner particles; a particle controller having at least one row of apertures through which the charged toner particles pass, the particle controller controlling a flow of said charged toner particles in the apertures; and carrying means for carrying the charged toner particles toward the apertures.

Other objects, features and advantages of the present invention will become apparent in the following specification and accompanying drawings.

BRIEF DESCRIPTION OF THE DRAWINGS

In the accompanying drawings:

FIG. 4(*b*) is a cross-sectional view illustrating the state where an electrode unit of the image recording unit is connected with a connector member.

Throughout the drawings, the same reference numbers or characters are used to refer to the same or like parts.

DESCRIPTION OF THE PREFERRED EMBODIMENTS

A preferred embodiment of the present invention will now be described in great detail with reference to the accompanying drawings.

Figure 1:
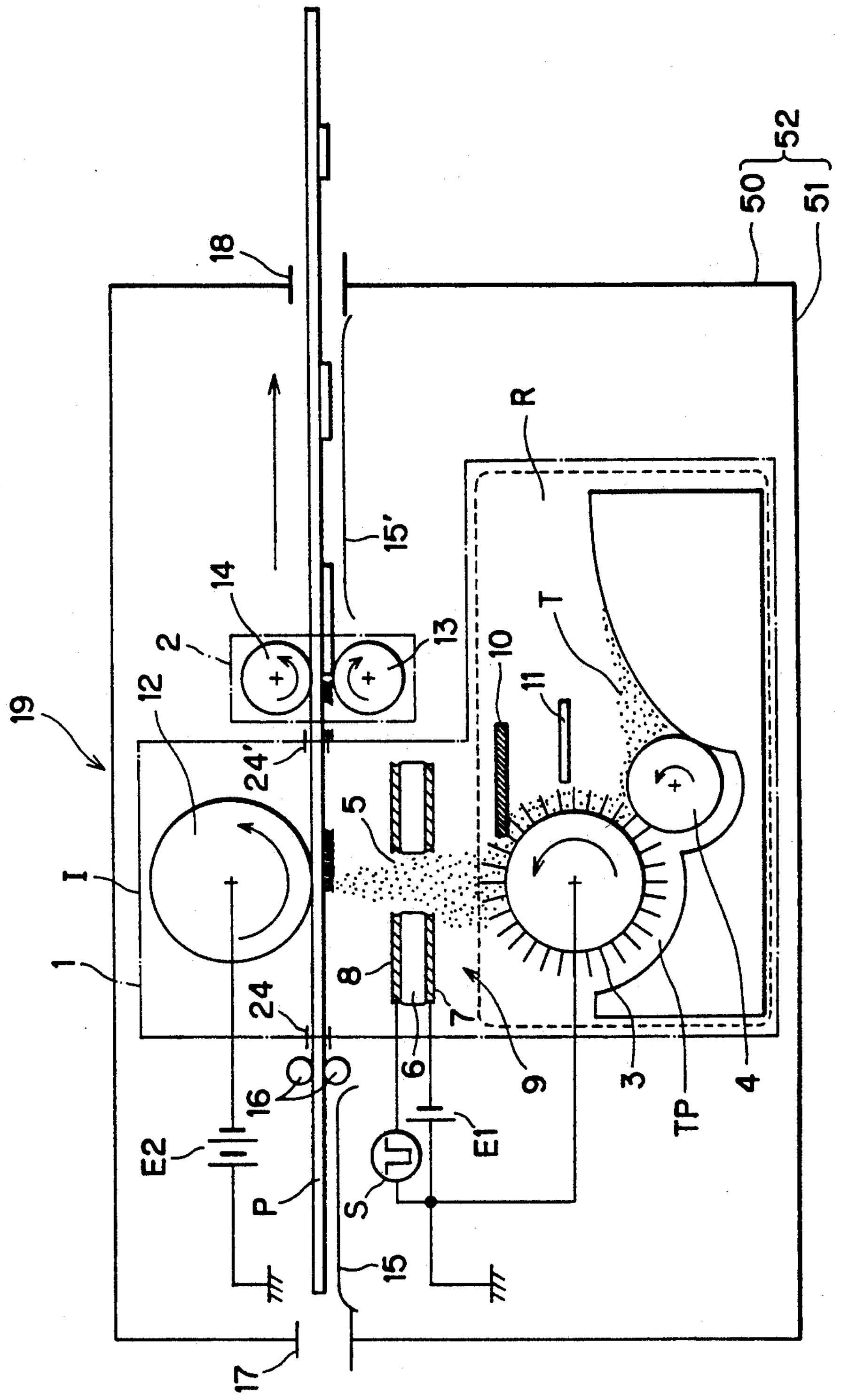
FIG. 1 shows a schematic structure of an image recording apparatus according to a preferred embodiment of the present invention.

FIG. 1 shows schematically a structure of an image recording apparatus of toner jet type according to the embodiment of the present invention which projects imaging material particles such as toner particles onto an image receiving medium such as a plain paper to thereby record visible images on the image receiving medium. The image recording apparatus 19 of this embodiment includes an apparatus housing 52 in which an image recording unit 1 serving as an image recording portion I is detachably installed and a pair of rolls 13 and 14 serving as a thermal fixing portion 2 is fixedly mounted. The image recording apparatus housing 52 consists of a bottom plate 51 and a cover member 50 which has both front and rear walls formed with an inlet 17 and an outlet 18, respectively. (In this description, the "forward direction" corresponds to the leftward direction in FIGS. 1 and 2, and the "rearward direction" corresponds to the rightward direction in the figures.)

The image recording unit 1 detachably installed internally of the apparatus 19 has both front and rear walls which confront the front and rear walls of the apparatus housing 52, respectively. The front and rear walls of the image recording unit 1 are formed with an insert opening 24 and an discharge-out opening 24'.

Between the inlet 17 of the apparatus housing 52 and the insert opening 24 of the image recording unit 1, there is provided a first guide member 15 and a pair of auxiliary conveying rolls 16. Between the discharge-out opening 24' of the image recording unit 1 and the outlet 18 of the apparatus housing 52, there are provided the thermal fixing portion 2 which includes a press roll 14 and a heat roll 13 enclosing therein a heat source and a second guide member 15'.

A passage for transferring an image receiving medium P in the image recording apparatus 19 is thus formed by the inlet 17, the first guide 15, the auxiliary conveying rolls 16, the insert opening 24, a back electrode roll 12 (which will e described later) and the discharge-out opening 24, of the image recording unit 1, the fixing portion 2, the second guide 15 and the outlet 18.

Thus, along the transferring passage, the image receiving medium inserted into the apparatus 19 through the inlet 17 is transferred along the guide 15 to the image recording unit 1. In the image recording unit, the image receiving medium is subjected to image recording operation. The image receiving medium is then transferred to the image fixing portion 2 in which the image is thermally fixed on the image receiving medium. Then, the image receiving medium is transferred along the guide 15' to be discharged out of the apparatus 19 through the outlet 18.

The image recording unit 1 serves as the image recording portion I for the image recording apparatus 19 and is detachably mounted internally of the image recording apparatus 19. The image recording portion I established by the image recording unit 1 will be schematically described hereinafter with reference to FIG. 1. The image recording unit 1 includes a particle reservoir portion R, a particle transfer portion S, a particle controller 9 and a back electrode roll 12. The particle reservoir portion R stores therein imaging material particles such as toner particles T.

The particle transfer portion TP includes means for electrostatically charging the toner particles supplied from the reservoir portion R and means for supplying or carrying thus charged imaging material particles to the particle controller 9. The particle transfer portion S is constructed by a particle supply roll 4, a brush roll 3, a particle thickness restriction member 11 and a scratching member 10. The particle supply roll 4 in a cylindrical shape is rotatably mounted internally of the image recording unit 1 at a position adjacent to the particle reservoir portion R. The brush roll 3 in a cylindrical shape is also rotatably mounted internally of the image recording unit 1. A number of ciliary members formed of elastic material are implanted on the peripheral surface of the brush roll 3. The brush roll 3 is placed such that its rotational axis extends parallel to a rotational axis of the particle supply roll 4 and such that the ciliary members of the brush roll 3 are contacted with a peripheral surface of the supply roll 4. Thus, the toner particles T in the reservoir portion R are transferred by the supply roll 4 to the brush roll 3 in accordance with rotations of the supply roll 4 as shown in FIG. 1. The imaging material particles T are triboelectrically charged with friction between the particles and the peripheral surface of the supply roll 4 and the peripheral surface and the ciliary members of the brush roll 3. The particles T are then held among the ciliary members on the brush roll 3 due to electrostatic force. The brush roll 3 and the supply roll 4 are rotated by a motor (not shown) fixedly mounted in the image recording apparatus 19. The brush roll 3 is electrically grounded.

The particle thickness restriction member 11 and a scratching member 10 are placed at such positions that the ciliary members of the brush roll 3 confront the thickness restriction member 11 and the scratching member 10 in this order in accordance with rotation of the brush roll 3, as shown in FIG. 1. The particle thickness restriction member 11 is in a blade shape extending parallel with a rotational axis of the brush roll 3. The thickness restriction member 11 scrapes off a part of the toner particles held among the ciliary members of the brush roll 3 so that a thickness of the particles held on the brush roll may be maintained to be fixed. The scratching member 10 is also in a blade shape extending parallel with the rotational axis of the brush roll 3. The scratching member is placed at such a position as to contact the ciliary members of the brush roll 3. The scratching member 10 scratches the ciliary members of the brush roll 3 in accordance with the rotation of the brush roll, as a result of which the imaging material particles jump out of the ciliary members to fly up toward a position adjacent to the particle controller 9.

As described above, the supply roll 4 and the brush roll 3 serve as the means for electrostatically charging the imaging material particles. The brush roll 3 and the scratching member 10 cooperate with each other to serve as the means for carrying or supplying the imaging material particles to the particle controller 9.

The particle controller 9 in a multilayered form includes a central insulative layer 6. A continuous conductive layer 7 serving as a reference electrode is coated on one side of the insulative layer 6 confronting the brush roll 3. Coated on the opposite side of the insulative layer 6 is a segmented conductive layer 8 consisting of a plurality of insulatively isolated conductive segments also referred to by the numeral 8 each serving as a control electrode. Each segment electrode 8 is insulatively isolated from each other. The segmented control electrodes 8 are arranged in at least one row extending parallel to the rotating axis of the brush roll 3. Apertures or holes 5 are formed through the multi-layered particle controller 9 so that a conductive segment 8 surrounds each aperture 5. The row or rows of the apertures 5 extends parallel with the rotating axis of the brush roll 3. A fixed electrical potential is applied to the reference electrode layer 7 from a direct current power supply El which is fixedly mounted in the apparatus housing 52. The polarity of the electrical potential applied to the reference electrode 7 is opposite to the polarity of the charged imaging material particles. Electrical potentials of image signals are selectively applied to the segmented control electrodes 8 from a plurality of signal sources S which are also fixedly mounted in the apparatus housing 52.

The cylindrically-shaped back electrode roll 12 is rotatably mounted internally of the image recording unit 1. The back electrode roll is disposed at such a position as to confront the segmented conductive layer 8 of the particle controller 9. The back electrode roll 12 has its rotational axis extending parallel to the row of the apertures 5 and the axis of the brush roll 3. The back electrode roll 12 is placed so as to contact, at its peripheral surface, the image receiving medium P inserted in the image recording unit through the insert opening 24, so that the back electrode roll conveys the image receiving medium in accordance with its rotation. The image receiving medium is thus conveyed in the image recording unit 1 along a path between the back electrode roll 12 and the particle controller 9. The back electrode roll is rotated by a motor (not shown) which is fixedly mounted in the apparatus housing 52. To the back electrode roll 12, a fixed electrical potential is applied from another direct current power supply E2 which is fixedly mounted in the apparatus housing. The polarity of the electrical potential is opposite to that of the charged imaging material particles. Since the power supply E2 is selected to apply an electric voltage greater than that of the power supply E1, an absolute value of the electrical potential applied to the back electrode 12 is greater than that of the reference electrode 7 of the particle controller 9.

The structure of the image recording unit 1 having the above-described schematical construction will be described in more detail hereinafter, with reference to FIG. 2 through 5.

Figure 2:
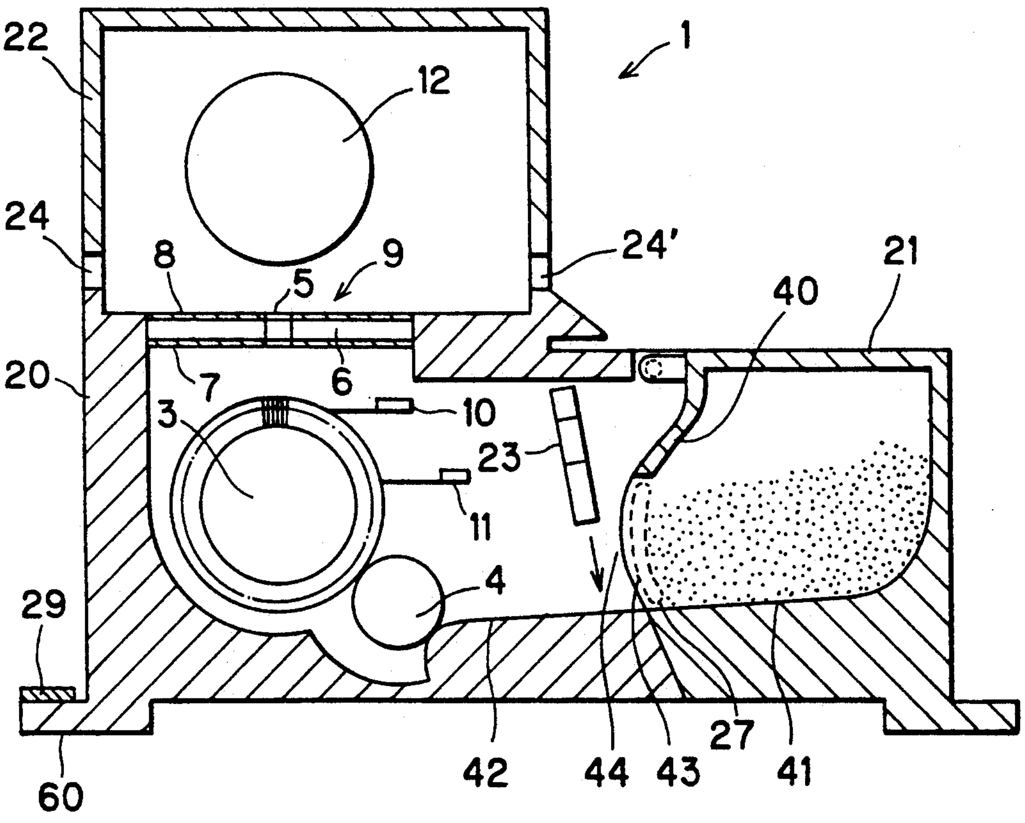
FIG. 2 is a vertical cross-sectional view of an image recording unit taken along a line II—II of FIG. 3 which is detachably installed internally of the image recording apparatus.

As shown in FIG. 2, the image recording unit 1 consists of three cartridge members, that is, an image forming cartridge 20, a particle reservoir cartridge 21 and a back electrode roll cartridge 22. The three cartridge members are manufactured separately, but are assembled into the single image recording unit 1. The particle reservoir cartridge 21 serves as the above-described particle reservoir portion R. The image forming cartridge 20 includes therein the particle transfer portion TP and the particle controller 9. The back electrode roll cartridge 22 accommodates therein the back electrode roll 12.

Figure 3:
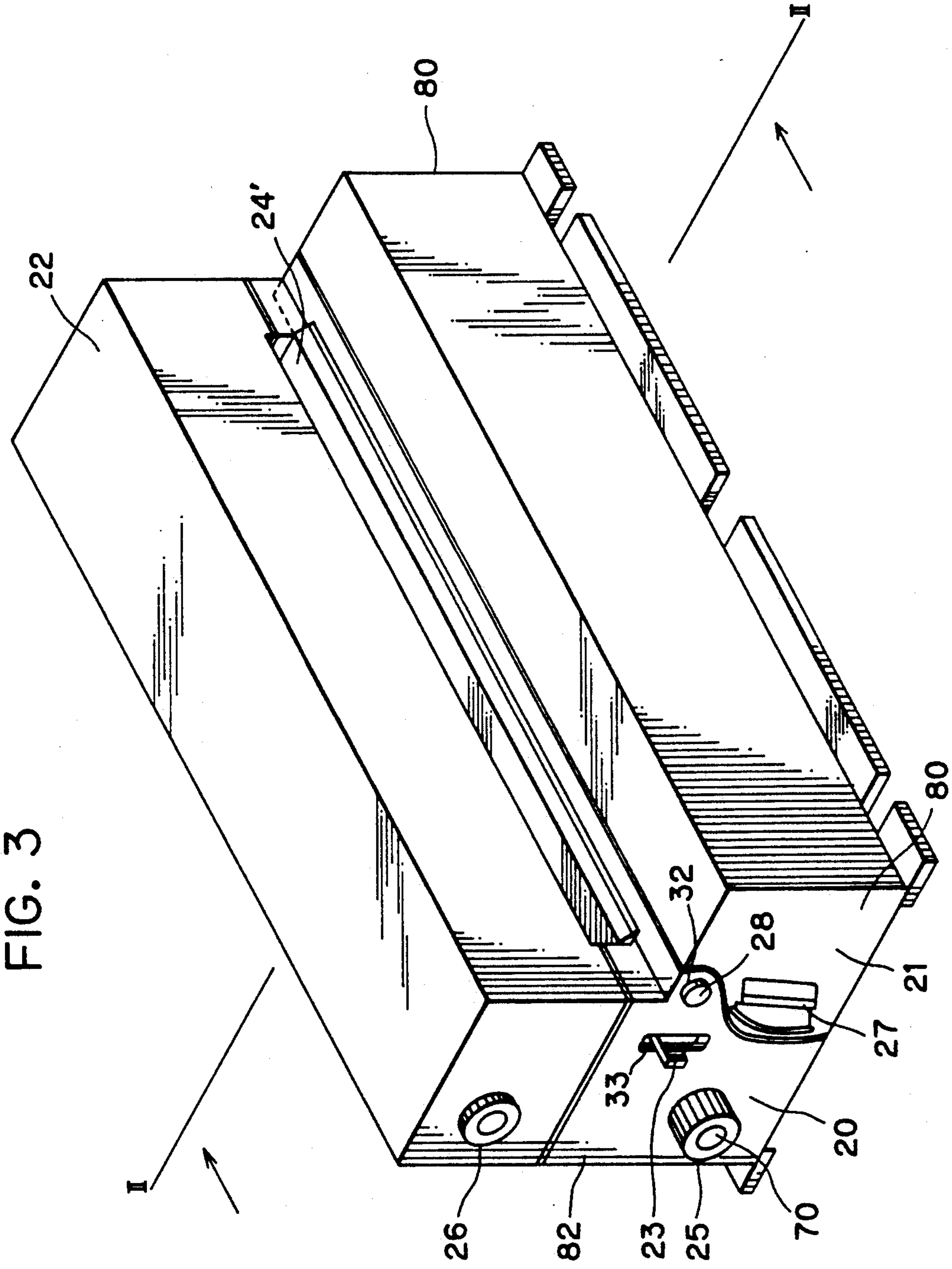
FIG. 3 is a perspective view of the image recording unit.
Figure 5:
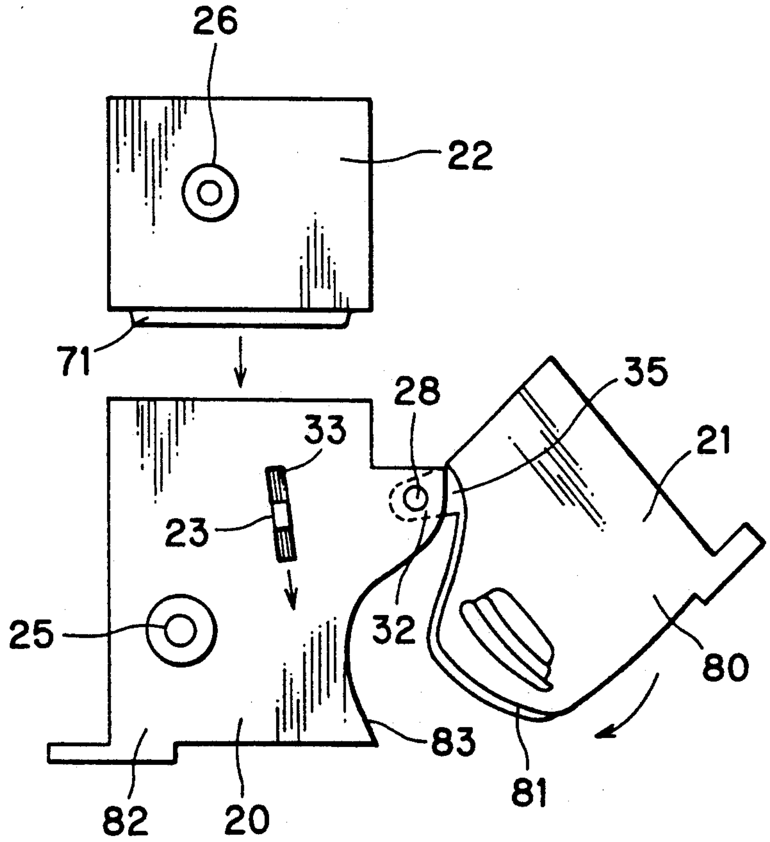
FIG. 5 illustrates the manner how a particle reservoir cartridge, a back electrode cartridge and an image forming cartridge are assembled into one single image recording unit.

As shown in FIGS. 2 and 3, the particle reservoir cartridge 21 is substantially in a rectangular parallelpiped shape formed of six walls. As shown in FIG. 5, both side walls 80 of the cartridge 21 have abutting faces 81 as their front sides. The vertical cross section of the abutting faces are curved to be fittingly contactable with abutting faces 83 of both side walls 82 of the image forming cartridge 20. In other words, the cartridge 21 is combined with the cartridge 20, with the abutting faces 81 and 83 being mated with each other. As shown in FIG. 2, a front wall 40 is continuously connected with the abutting faces 81 of the side walls 80. A front opening 43 is formed at a lower portion of the front wall 40.

As shown in FIG. 5, a pair of brackets 35 extend forwardly from the front wall 40 of the cartridge 21 at positions adjacent to the side walls 80 on its uppermost positions. On tip ends of the brackets, there are provided protrusions 28 which are engageable with apertures or holes 32 which are formed on both side walls of the image recording cartridge 20. An operator engages the protrusions 28 with the holes 32, and pivotally moves the cartridge 21 about an axes of the protrusions until when the abutting faces 81 of the side walls of the cartridge 21 are brought into abutment contact with the abutting faces 83 of the side walls of the cartridge 20. As a result, the particle reservoir cartridge 21 is completely combined with the image recording cartridge 20.

The cartridge 21 includes therein an internal hollow portion for storing therein the imaging material particles T. The internal hollow portion is defined by inner surfaces of the six walls of the cartridge 21. The internal hollow portion is communicatable with an internal hollow portion of the image recording cartridge 20 through the front opening 43 of the cartridge 21 and a rear opening 44 of the cartridge 20, as shown in FIG. 2. An inner bottom surface 41 of the cartridge 21 is gradually downwardly inclined toward the opening 43 so that the toner particles stored in the hollow portion of the cartridge 21 may be moved along the slanted surface 41 due to gravitational force to be transferred through the openings 43 and 44 into the inside of the image recording cartridge 20.

The cartridge 21 is manufactured, with the front opening 43 being covered with a sealing member 27 such as an elongated vinyl ribbon, in order to prevent the imaging material particles T from being spilled out of the cartridge 21 at the time when the cartridge 21 is being combined with the cartridge 20 as described already. As shown in FIG. 3, both side walls ar formed with apertures through which both ends of the strip-shaped sealing member 27 are projected outwardly of the cartridge 21 to thereby provide tab portions. Therefore, after when the cartridge 21 is completely combined with the cartridge 20, the operator grasps one of the tab portions to thereby draw out the sealing member 27 from the cartridge, as a result of which the internal hollow portions of the cartridges 20 and 21 are communicated with each other through the openings 43 and 44.

The image forming cartridge 20 includes the internal hollow portion where the supply roll 4, the brush roll 3, the particle thickness restriction member 11, the scratching member 10 and the particle controller 9 are mounted in such a manner as described already. The image forming cartridge 20 has the rear opening 44 through which the internal hollow portions of the cartridges 20 and 21 are communicatable with each other. In other words, the front opening 43 of the cartridge 21 and the rear opening 44 of the cartridge 20 are associated with each other to thereby spacially communicate the cartridges 20 and 21 with each other. Both side walls 82 of the cartridge 20 have the abutting faces 83 which are so curved as to be fittingly contactable with the abutting faces of the side walls of the cartridge 21.

Furthermore, as described already, both of the side walls 82 of the cartridge 20 are formed with a pair of holes 32 at their uppermost positions. The holes 32 are engageable with the protrusions 28 of the cartridge 21 so that the operator may angularly move the cartridge 21 with respect to the cartridge 20 to thereby combine the cartridge 21 with the cartridge 20.

The image forming cartridge 21 has an inner bottom surface 42 which is gradually downwardly inclined from the opening 44 toward the supply roll 4, as shown in FIG. 2. The inner bottom surface 42 is continuously connectable with the inner bottom surface 41 of the particle reservoir cartridge 21 when the cartridges 20 and 21 are combined with each other. Therefore, when the cartridges 20 and 21 are combined with each other, the imaging material particles may be transferred from the cartridge 21 to the cartridge 20 along the inner bottom surfaces 41 and 42. Furthermore, as shown in FIG. 2, the inner bottom surface 42 is configured so that the imaging material particles supplied into the cartridge 20 may be effectively and sufficiently supplied to the supply roll 4.

There is provided an elongated stopper plate 23 in the internal hollow portion of the cartridge 20. The stopper plate 23 is slidably supported at its both ends in a pair of long and narrow apertures 33 formed on both side walls 82 of the cartridge 20. Both end portions of the stopper plate 23 project outwardly from the apertures 33 so that an user may grasp the end portions of the plate 23 and move the plate upwardly or downwardly along the apertures 33. Thus, the stopper plate 23 is movable along the apertures 33 toward and away from the inner bottom surface 42. The plate 23 is therefore contactable with the inner bottom surface 42 as indicated by chain line in FIG. 2 to thereby prevent the imaging material particles inside the cartridge 20 from being spilled out of the cartridge when the particle reservoir cartridge 21 is detached from the cartridge 20. The plate 23 is also separatable from the surface 42 to confront the front wall 40 of the cartridge 21 as indicated by solid line in the figure to thereby communicate the internal hollow portions of the cartridges 20 and 21 through the openings 43 and 44.

Figure 4B:
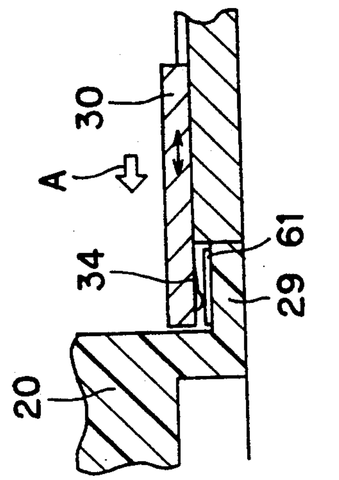
FIG. 4(*a*) is a perspective view showing the state where the image recording unit is installed in the image recording apparatus housing.
Figure 4A:
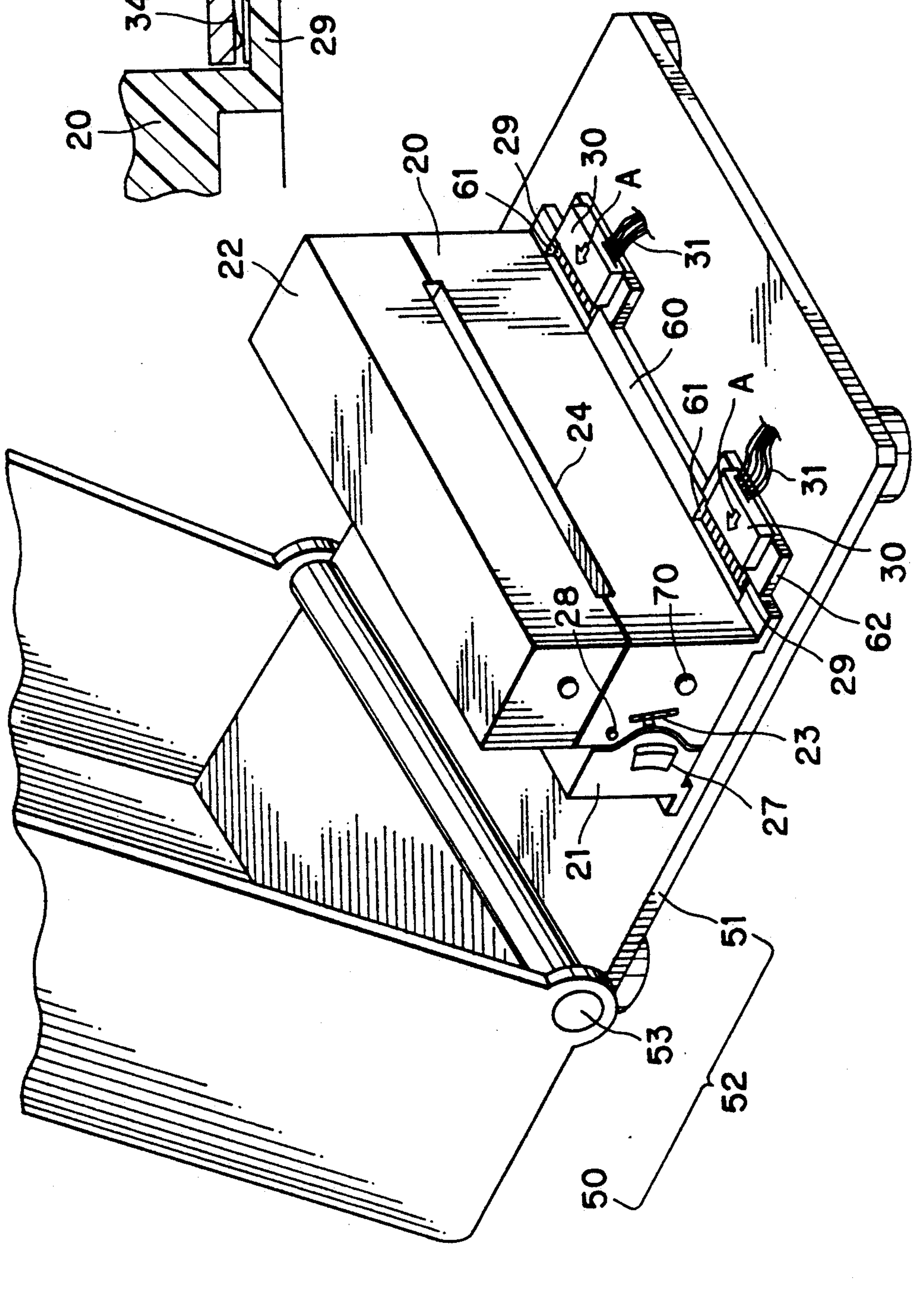

There are provided a pair of electrode units 29 on a pair of recesses formed on an upper surface of a front leg portion 60 of the image forming cartridge 20, as shown in FIGS. 2, 4(*a*) and 4(*b*). The electrode units 29 include a plurality of electrodes 61 which are electrically connected to the plurality of segment electrodes 8 and the reference electrode 7 of the particle controller 9 and the brush roll 3, respectively, through electrical connecting members such as metal strips and wirings. Furthermore, one of the electrodes 61 of the electrode units is, electrically connectable to the back electrode roll 12 mounted inside the cartridge 22 at the time when the cartridge 22 is combined with the image forming cartridge 20.

As shown in FIG. 4(*a*), in the apparatus housing 52, there are provided a pair of connector members 30 which are electrically connected through cable members 31 to the direct current power supplies El and E2, the signal power sources S and the ground potential sources which are fixedly secured to the bottom plate 51 of the apparatus housing 52. (In FIG. 4(*a*), the direct current power supplies El and E2, the signal power sources S, the ground potential sources and the members 13, 14, 15, 15', 16, 17, 18 are neglected from the figure for simplicity and clarity.) The connector members 30 have a plurality of connecting protrusions 34. The connecting protrusions 34 are contactable with the electrodes of the electrode units 29 so as to electrically connect the segment electrodes 8, the reference electrodes 7, the brush roll 3 and the back electrode roll 12 mounted internally of the image recording unit 1 to the signal power sources S, the direct current power supply E1, the ground potential source and the direct current power supply E2, respectively.

The pair of connector members 30 are slidably mounted on a pair of support plates 62 fixedly mounted on the bottom plate 51 of the apparatus housing 52. The image recording unit 1 is mounted on the bottom plate 51 such that the front face of the front leg portion 60 may contact rear faces of the support plates 62. Then, the connector members 30 are slidingly moved on the support plates in a direction toward the image recording unit 1 as indicated by an arrow A in FIGS. 4(*a*) and 4(*b*). As a result, the lower surfaces of the connector members 30 confront the electrode units 29. Since the plurality of connecting protrusions 34 are provided on the lower surfaces of the connector members 30, the connecting protrusions are contacted with the corresponding electrodes 61 of the electrode unit 29, so that the connector members 30 are electrically connected with the electrode units 29. As apparent from the above, the support plates 62 and the connector members 30 cooperate with each other to lock the image recording unit 1 with respect to the apparatus housing bottom plate 51, to thereby fixedly secure the unit 1 in the housing 52.

As shown in FIG. 3, a rotating shaft 70 of the brush roll 3 is protruded outwardly of the image forming cartridge 20. A gear member 25 is fixedly secured to one end of the shaft 70 at a position outside of the cartridge 20. The gear member 25 is engageable with a gear provided on a shaft of a motor (not shown) which is fixedly mounted in the apparatus housing 52. The rotating shaft 70 of the brush roll 3 is further provided with another gear member (not shown) at a position inside of the cartridge 20. The gear member is connected via a gear mechanism (not shown) with a gear member (also not shown) mounted on a rotating shaft of the particle supply roll 4. Thus, the brush roll 3 and the particle supply roll 4 are driven by the motor to be rotated in a directions as indicated by arrows in FIG. 1.

The back electrode roll cartridge member 22 will be described hereinafter. The back electrode roll 12 is rotatably supported in the back electrode cartridge 22. The back electrode cartridge 22 has an U-shaped vertical cross section having a lower opening end. As shown in FIG. 5, the back electrode cartridge 22 has guide rib 71 at its lower end which is fittingly contactable with inner surfaces of the walls of the image forming cartridge 20. The back electrode cartridge 22 is detachably mounted on the image forming cartridge 20, with the guide rib 71 of the cartridge 21 being fitted in the cartridge 20. Thus, the cartridges 20 and 22 are combined with each other in such a manner that the back electrode 12 in the cartridge 22 may confront the segment electrodes 8 of the particle controller 9 in the cartridge 20.

The back electrode cartridge 22 has recessed portions on its both front and rear walls at their lower ends. The image recording cartridge 20 has recessed portions on its both front and rear walls at their upper ends. When the back electrode cartridge 22 is mounted on the image forming cartridge 20 as described above, the recessed portions of the cartridges 20 and 22 at their front walls confront each other to form the insert opening 24 and the recessed portions of the cartridges 20 and 22 at their rear walls confront each other to form the discharge opening 24'.

Electrical connection between the back electrode roll 12 of the cartridge 22 and the electrode units 29 of the cartridge 20 is established when the guide rib 71 of the cartridge 22 is fittingly contacted with the inner surfaces of the walls of the cartridge 20. As a result, the back electrode roll 12 is electrically connected to the direct current power supply E2 via the connector member 30 and the cable 31.

A rotating shaft of the back electrode roll 12 is rotatably supported by both the side walls of the cartridge 22. Both tip ends of the rotating shaft are protruded outwardly of the cartridge 22, as shown in FIG. 3. A gear member 26 is fixedly mounted on one of the tip ends of the rotating shaft at the outside of the cartridge 22. The gear member is connected via a gear mechanism (not shown) with a gear of the motor shaft which is used to rotate the brush roll 3 and the supply roll 4. Therefore, the back electrode roll 12 is also driven by the motor to be rotated as indicated by an arrow in FIG. 1.

As described above, the particle reservoir cartridge 21, the image forming cartridge member 20 and the back electrode roll cartridge 22 are detachably combined with each other to thereby construct the single unit 1. The cartridge 21 is detachable from the cartridge 20 so that only the particle reservoir cartridge 21 can be replaced with a new one when the reservoir cartridge is exhausted. Furthermore, the cartridge 22 is detachable from the cartridge 20 so that only the cartridges 20 and 21 may be replaced with new ones.

The image recording unit 1 constructed above i detachably mounted on the bottom plate 51 of the apparatus housing 52. On the bottom plate 51, there are fixedly mounted the pair of support plates 62, the pair of connector members 30, the cables 31, the direct current power supplies E1 and E2, the signal sources S and the ground potential source. The cover member 50 is provided with the inlet 17, the outlet 18, the pair of guide members 15 and 15', the auxiliary rolls 16 and the image fixing portion 2 consisting of the heat roll 13 and the press roll 14.

The image recording operation of the image recording apparatus 19 constructed as described above will be described hereinafter.

As shown in FIG. 1, the image receiving medium P is inserted into the image recording apparatus 19 through the inlet 17. The image receiving medium P is transferred along the first guide 15 in accordance with the rotations of the auxiliary conveying rolls 16, so that the image receiving medium is inserted into the image recording unit 1 through the insert opening 24.

In the image recording unit 1, the imaging material particles such as toner particles T are transferred along the inclined bottom surfaces 41 and 42 of the cartridges 21 and 22 from the particle reservoir cartridge 21 to the supply roll 4 in the image recording cartridge 20.

Since the supply roll 4 is rotated by the motor, the particles T are triboelectrically charged with friction between the particles and the supply roll. As a result, the particles T are electrostatically attached onto the peripheral surface of the supply roll 4.

In accordance with further rotation of the supply roll 4, the particles T attached on the supply roll 4 are transferred to such a position that the particles T may contact the ciliary members or the peripheral side surface of the brush roll 3. Since the brush roll 3 is also rotated by the motor, the particles T are further charged triboelectrically with friction between the particles and the ciliary members and the peripheral side surface of the brush roll 3. Thus charged particles are held among the ciliary members on the peripheral side surface of the brush roll 3 due to an electrostatic force. For example, the polarity of thus charged particles is positive, though the polarity of thus triboelectrically charged particles is determined according to the kinds of the particles and the materials of the peripheral surfaces of the rolls 3 and 4 and the ciliary members of the roll 3.

The brush roll 3 holding thereon the particles are further rotated. If the amount of the particles held among the ciliary members of the brush roll 3 is excessively large, the particle thickness restriction member 11 contacts the particles to thereby scrape the particles off the brush roll. Thus, the thickness of the particles held on the brush roll is maintained to be fixed so that the particles may be uniformly held on the brush roll 3.

In accordance with further rotation of the brush roll 3, the imaging material particles held on the brush roll is transferred to a position confronting to the scratching member 10. The scratching member 10 contacts the ciliary members to thereby elastically deform the ciliary members. In accordance with further rotation of the brush roll 3, the deformed ciliary members are separated from the scratching member 10, so that the ciliary members spring back due to their elasticity to restore their original states. At this moment, the imaging material particles T held on the ciliary members jump up out of the ciliary members to fly up into a region between the brush roll 3 and the particle controller 9. The particles then form a mist of imaging material particles floating at the region adjacent to the particle controller 9.

The positively charged mist of imaging material particles T are electrostatically attracted to the reference electrode layer 7 of the modulator 9, since the reference electrode layer 7 is connected to the direct current power supply El to be charged to a negative polarity. Though such a fixed negative electrical potential is applied to the reference electrode 7, selected potentials are applied to the segmented control electrodes 8 from the signal sources S. That is, image signals corresponding to an image to be reproduced are applied to the segment electrodes 8 from the signal sources S.

The image signals corresponding to non-image portions have a polarity the same with that of the imaging material particles (that is, positive) and have such a value as is sufficient to prevent the particles T electrically attracted by the reference electrode layer 7 from passing through the apertures 5 of the particle controller 9. On the other hand, the image signals corresponding to image portions have such polarities and values as are unable to prevent the particles attracted by the reference electrode 7 from passing through the apertures 5. The values of the potentials of the image signals corresponding to the image portions are changed according to density of the image to be reproduced. The control electrodes 8 thus modulate densities of the particle streams passing through the apertures 5, according to the image signals applied to the control electrodes 8.

After having passed through the apertures 5, the positively charged imaging material particle streams with their densities having been modulated by the controller 9 are electrostatically attracted to be accelerated in a direction toward the back electrode roll 12, since the back electrode is connected to the direct current power supply E2 to be charged to a negative polarity and to have an electric potential, absolute value of which is greater than that of the reference electrode 7. The image receiving medium P inserted into the image recording unit 1 is interposed between the particle modulator 9 and the back electrode roll 12 and is contacted with the peripheral surface of the back electrode roll 12 to be conveyed in accordance with its rotation. Therefore, the particles having passed through the particle modulator 9 to be attracted toward the back electrode roll 12 are electrostatically attached onto a surface of the image receiving medium P.

According to the rotation of the back electrode roll 12, the image receiving medium is translated relative to the particle modulator 9 synchronously with the application of the image signals to the segment control electrodes 8. Therefore, the particles attached onto the image receiving medium P form a visible image corresponding to the image signals supplied from the signal sources.

The image receiving medium P on which the imaging material particles are thus attached is discharged out of the image recording unit 1 through the opening 24'. The image receiving medium P is then transferred toward the image fixing portion 2 where the image receiving medium is held between the heat roll 13 and the press roll 14. The press roll 14 presses the image receiving medium against the thermally heated heat roll 13, so that the toner image on the image receiving medium is thermally fixed. Details of the image fixing process is omitted from this description, since it is well known.

The image receiving medium with an image fixed thereon is further transferred along the guide member 15' to be discharged out of the image recording apparatus 19 through the outlet 18. Thus, according to the image recording apparatus 19 of the present invention, it is possible to form desired images on the image receiving medium.

According to the present invention, when the image recording portion I gets out of order, the image recording unit 1 serving as the image recording portion I can be easily detached from the apparatus housing 52. For example, the image recording unit 1 can be replaced with a new one when it becomes necessary to clean or adjust the particle controller 9 or replace it with a new one. In this case, since the back electrode roll cartridge 22 is detachably coupled to the image recording cartridge 20, only the image recording cartridge 20 may be changed with a new one. Furthermore, when the particle reservoir cartridge 21 is exhausted, only the cartridge 21 may be changed with a new one.

The manner how the image recording unit 1 is detachably mounted in the apparatus housing 52 of the image recording apparatus 19 will be described hereinafter.

When the image recording unit 1 is to be mounted inside of the apparatus housing 52, the cartridges 20, 21 and 22 are first assembled into the single image recording unit 1. The guide rib 71 of the back electrode cartridge 22 is fitted to the inner surfaces of the walls of the image forming cartridge 20, so that the cartridge 22 is combined with the image recording cartridge 20.

The pair of protrusions 28 on the brackets 35 of the cartridge 21 are inserted into the apertures 32 on the cartridge 20. Then, the cartridge 21 is pivotally moved around the axis of the protrusions 28 with respect to the cartridge 20 until when the abutting faces 81 of the side walls 80 of the cartridge 21 are brought into fittingly contact with the abutting faces 83 of the side walls 82 of the cartridge 20. Then, the sealing member 27 is pulled out of the cartridge 21, so that the imaging material particles reserved in the cartridge 21 are transferred through the openings 43 and 44 into the cartridge 20. Thus, the cartridges 20 21 and 22 are completely assembled into the single unit 1.

When thus assembled image recording unit 1 is installed in the apparatus housing 52, the housing cover member 50 is pivotally upwardly moved around its rotating shaft 53 to open the apparatus housing. The image recording unit 1 is mounted on the bottom plate 51 in such a position that the front face of the front leg portion 60 contacts the support plates 62. Then, the connector members 30 are slidingly moved on the support plates 62, so that the connecting protrusions 34 on the connector members 30 are contacted with the electrodes of the electrode units 29 and the image recording unit 1 is fixedly secured to the apparatus housing 52. Thus, the image recording unit 1 is completely mounted on the bottom plate 51. Then, the cover member 50 is pivotally downwardly moved, so that the housing 52 is closed.

When only the particle reservoir cartridge 21 is to be replaced with a new one, as shown in FIG. 5, the stopper plate 23 in the cartridge 20 is first moved downwardly until when the stopper plate 23 is brought into abutment contact with the inner bottom surface 42 of the cartridge 20. The stopper plate 23 contacted with the inner bottom surface 42 prevents the imaging material particles T in the cartridge 20 from being spilled out of the cartridge through the front opening 44 during when the replacement of the cartridge 21 is conducted. Then, the particle reservoir cartridge 21 combined with the cartridge 20 is angularly moved in a counterclockwise direction in FIG. 5 about the axis of the protrusions 28 with respect to the cartridge 20. Then, the protrusions 28 are disengaged from the apertures 32, so that the cartridge 21 is detached from the cartridge 20. Then, protrusions 28 of a new cartridge 21 are inserted into the apertures 32 of the cartridge 20 and the new cartridge 21 is angularly moved in a clockwise direction until when the abutting faces of the side walls of the cartridge 21 are brought into abutment contact with the abutting faces of the side walls of the cartridge 20. Then, the stopper plate 23 in the cartridge 20 is moved upwardly and the sealing member 27 is pulled out of the cartridge 21, so that the internal hollow portions of the cartridges 20 and 21 are communicated with each other through the openings 43 and 44. As a result, the imaging material particles T received in the cartridge 21 are supplied into the cartridge 20.

In the image recording apparatus 19 of the above-described embodiment of the present invention, the imaging material particle streams are made to flow upwardly in the image recording unit of the above-described embodiment. However, the image recording unit may be constructed so that the imaging material particle streams may flow downwardly. Furthermore, the guide members 15 and 15' and the fixing portions 2 consisting of the heat roll and the press roll may be included in the image recording unit.

As described above, according to the image recording apparatus of the present invention, at least the electrostatically particle charging means, the particle supply or carry means and the particle controller are accommodated in a single unit which is detachably mounted in the image recording apparatus. Therefore, in the case where either one or ones of the particle charging means, the particle supply means and the controller get out of order, the operator may simply replace the unit member with a new one.

The single unit may be provided with a particle reservoir cartridge in such a manner that the particle reservoir cartridge may be detachably coupled to the single unit. In this case, when the particle reservoir cartridge is exhausted out, only the particle reservoir cartridge may be replaced with a new one.

The single unit may also be provided with a back electrode. In this case, the back electrode may be fixedly secured to the single unit or may be included in a cartridge member detachably mounted on the single unit. Alternatively, the back electrode may be fixedly secured to the image recording apparatus housing, since there is less possibility that the back electrode roll may be troubled or get out of order in comparison with the control electrodes and the particle supply portion.

A second preferred embodiment of the present invention will be described below with reference to FIGS. 6 through 10. According to the second embodiment, the image forming cartridge 20 of the image recording unit 1 is further provided with vibration applying means for vibrating the particle controller to thereby prevent the imaging material particles from being attached to the particle controller.

The image recording apparatus 19 of the second embodiment will be described in detail below.

Figure 6:
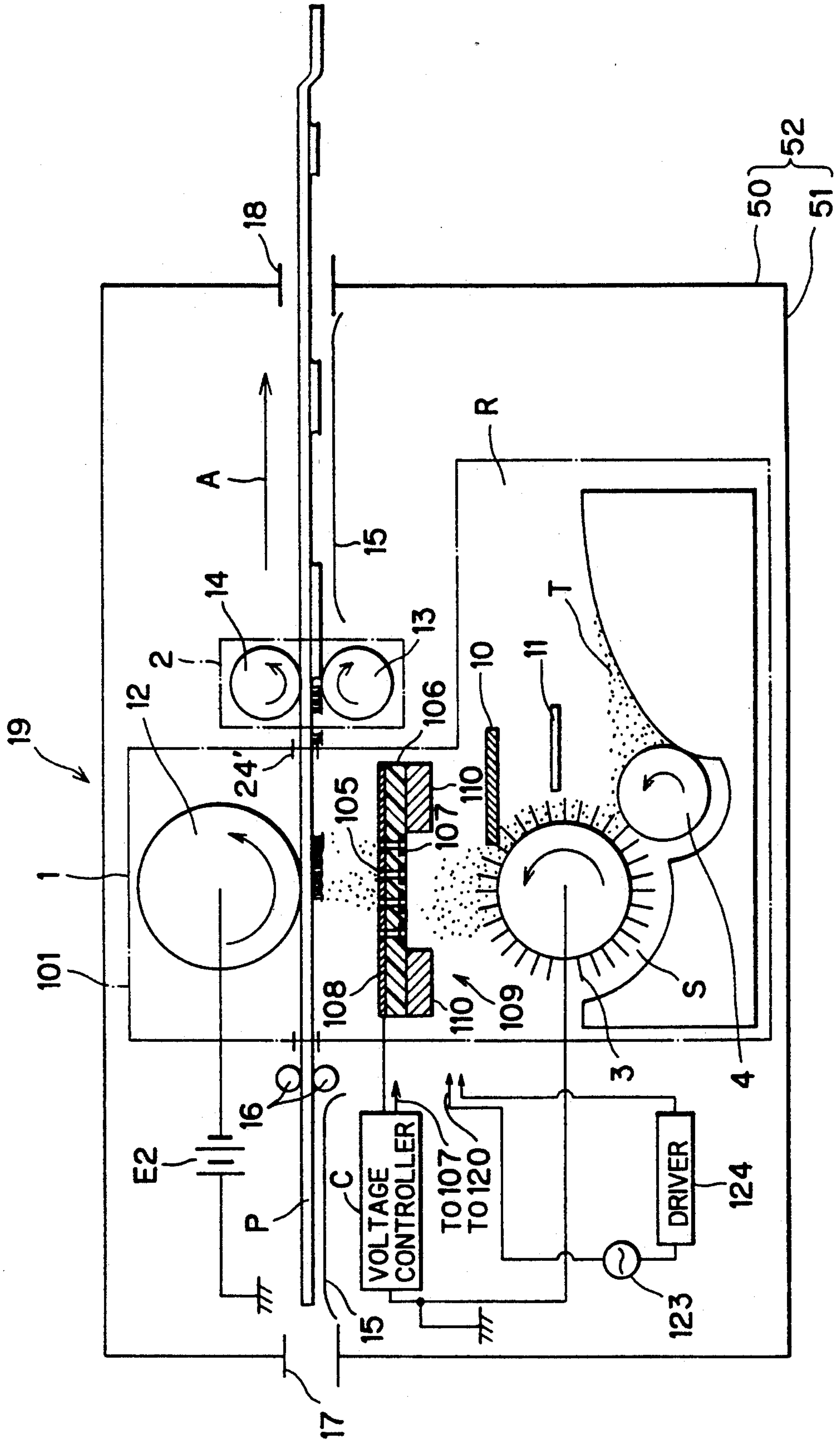
FIG. 6 shows a schematic structure of an image recording apparatus according to a second preferred embodiment of the present invention.

According to the image recording apparatus 19 of the embodiment, the particle controller 109 corresponding to the particle controller 9 of the first embodiment is of a type that is driven in matrix form. More specifically to say, as shown in FIG. 6, the particle controller 109 includes a central insulative layer 106. As apparently shown in FIG. 10, there are formed a plurality of scanning electrodes 107 on a surface of the central insulative layer 6 confronting the brush roll 3. Each scanning electrode 107 is an elongated shape which extends in a direction parallel to the rotational axis of the brush roll 3 and therefore extends in a direction perpendicular to a transfer direction of the image receiving medium P which is indicated by an arrow A of FIG. 6. The plural scanning electrodes 107 are arranged along the image receiving medium transferring direction A, and are insulatively isolated from one another. The scanning electrodes 107 are connected to a voltage controller C which is mounted on the bottom plate 51 of the image recording apparatus housing 52 and which is adapted for controlling application of scanning voltages to the respective scanning electrodes 107.

Figure 8:
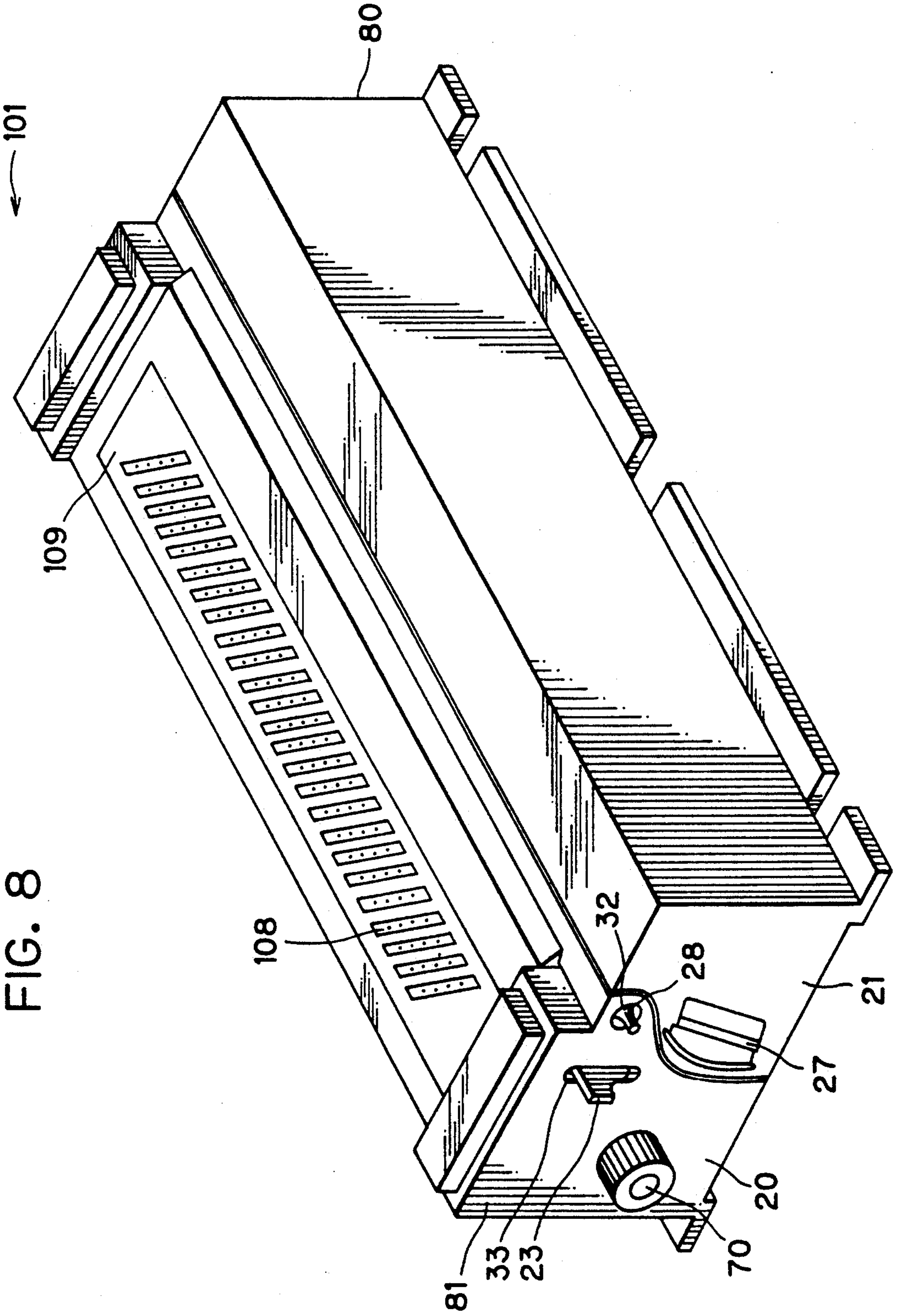
FIG. 8 is a perspective view of the image recording unit of the second embodiment from which removed is the back electrode roll cartridge.

As shown in FIG. 8, on the other surface of the insulative layer 106 which confronts the back electrode roll 12, there are formed a plurality of data electrodes 108. Each data electrode 108 is in an elongated shape which extends in a direction inclined with respect to the image recording medium transfer direction A. Accordingly, each data electrode 108 extends in a direction inclined with respect to the elongated direction of the scanning electrodes 107. The data electrode 108 are insulatively isolated from one another. The data electrodes 108 are connected also to the voltage controller C which is adapted also for controlling application of data voltages to the respective data electrodes 108.

Figure 9:
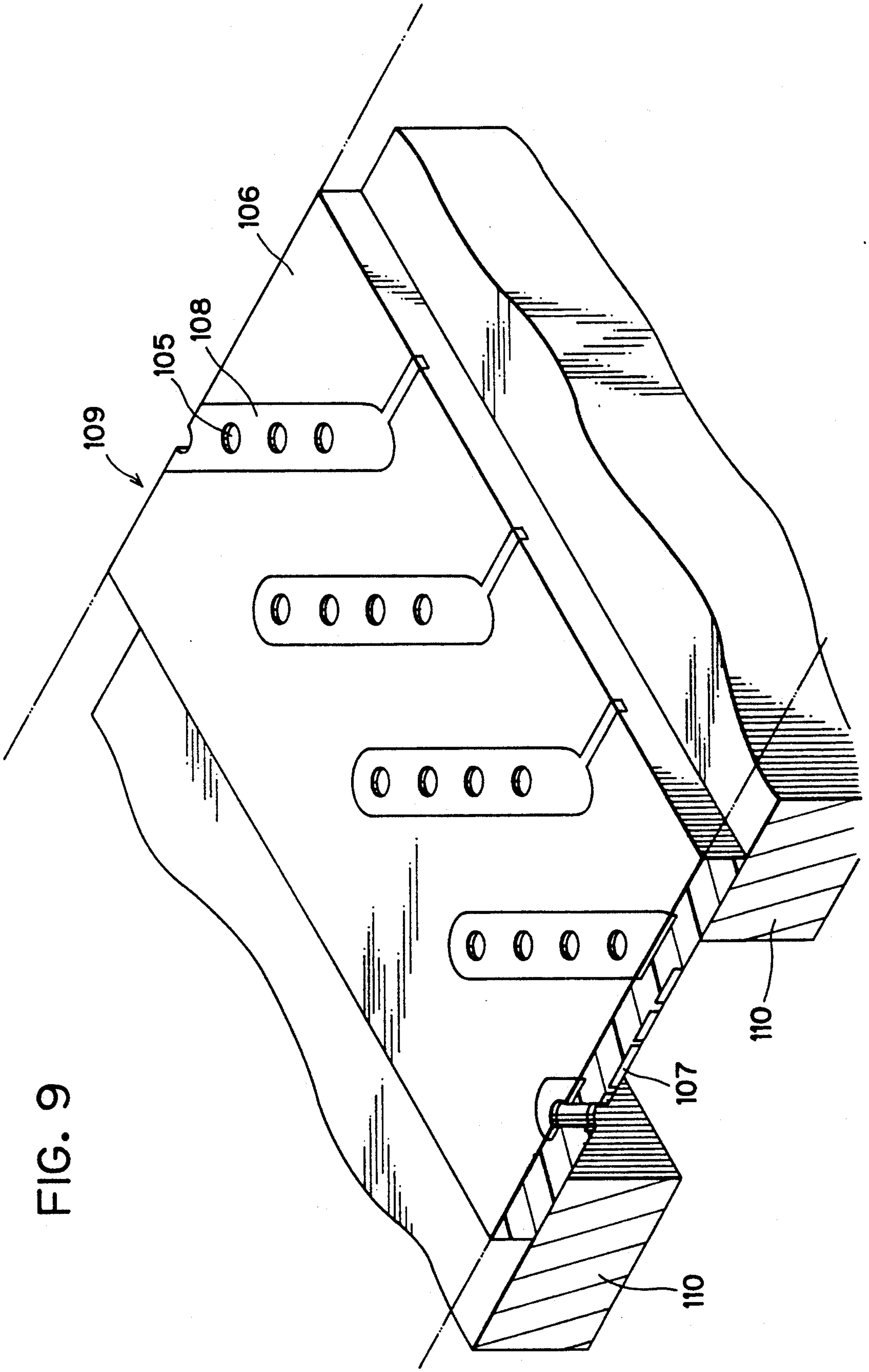
FIG. 9 is a perspective view showing a part of the particle controller and the vibration enhancing plate, with the data electrodes of the particle controller facing up.

As shown in FIG. 9, a plurality of apertures 105 are formed so as to penetrate the scanning electrodes 107, the insulative layer 106 and the data electrodes 108. Since the scanning electrodes 107 and the data electrodes 108 extend in directions inclined with respect to each other, each aperture 105 may penetrate one scanning electrode 107 and corresponding one data electrode 108. In other words, the apertures 105 are formed at respective intersection points between the scanning electrodes 107 and the data electrodes 108.

The voltage controller C supplies the scanning electrodes 107 with the scanning voltages and the data electrodes 108 with the data voltages, to thereby selectively bring the apertures on the intersection points of the electrodes 107 and 108 into one state for allowing the imaging material particles to pass therethrough and the other state for preventing the imaging material particles from being passed therethrough. More specifically, with respect to the positively charged imaging material particles T, the voltage controller C selectively applies to the scanning electrodes 107 first and second scanning voltages Vs1 and Vs2 both of negative polarity. An absolute value of the first scanning voltage Vs1 is determined to be larger than that of the second scanning voltage Vs2. The voltage controller C also selectively applies to the data electrodes 108 first and second data voltages Vd1 and Vd2 both of negative polarity. An absolute value of the first data voltage Vd1 is determined to be smaller than that of the second data voltage Vd2. Furthermore, the absolute value of the first data voltage Vd1 is determined to be smaller than those of both the first and second scanning voltages Vs1 and Vs2. The absolute value of the second data voltage Vd2 is determined to be smaller than that of the first scanning voltage Vs1 but larger than that of the second voltage Vs2. In other words, the absolute values of the voltages Vs1, Vs2, Vd1 and Vd2 satisfy the following express:

$$|Vs1|>|Vd2|>|Vs2|>|Vd1|$$

Therefore, in the apertures on the intersection points between the scanning electrodes 107 to which applied is the second scanning voltage Vs2 and the data electrodes 108 to which applied is the second data voltage Vd2, an electric field is formed for electrostatically attracting the positively charged imaging material particles in a direction toward the back electrode roll 12. In the apertures on the intersection points of the scanning electrodes 107 and the data electrodes 108 to which other combinations of the scanning voltages and the data voltages (e.g., Vs1−Vd1, Vs1 −Vd2, Vs2−Vd1) are applied, there are formed electric fields for preventing the positively charged imaging material particles from being passed therethrough. Accordingly, only the apertures on the intersection points of the scanning electrodes and the data electrodes to which the combination of the second scanning voltages and the second data voltages (Vs2−Vd2) are applied allow the imaging material particles to pass therethrough to reach the image receiving medium P. The imaging material particles then adheres to the image receiving medium P to form a visible image thereon. More specifically to say, the imaging material particles which have passed through each aperture construct each dot for the visible image. As apparent from the above description, the applications of the scanning voltages and the data voltages correspond to the application of the image signals to the segment electrodes in the first embodiment.

According to the second embodiment, the absolute value of the negative voltage applied to the back electrode roll 12 from the direct current power supply E2 is selected to be larger than that of the second data voltage Vd2 so that the positively charged imaging material particles having passed the particle controller 109 may be further accelerated in a direction toward the back electrode roll 12.

Figure 7:
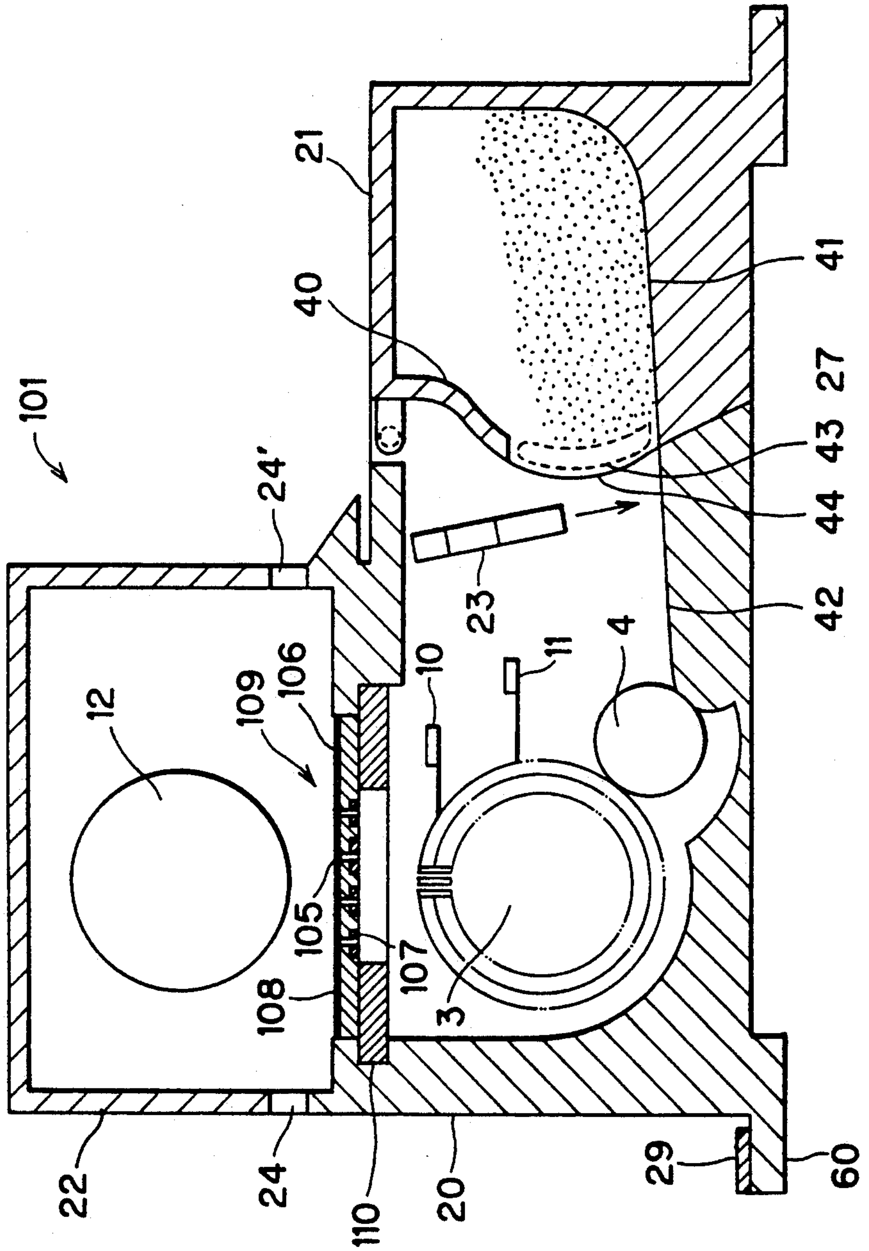
FIG. 7 is a vertical cross-sectional view of an image recording unit of the second embodiment.
Figure 10:
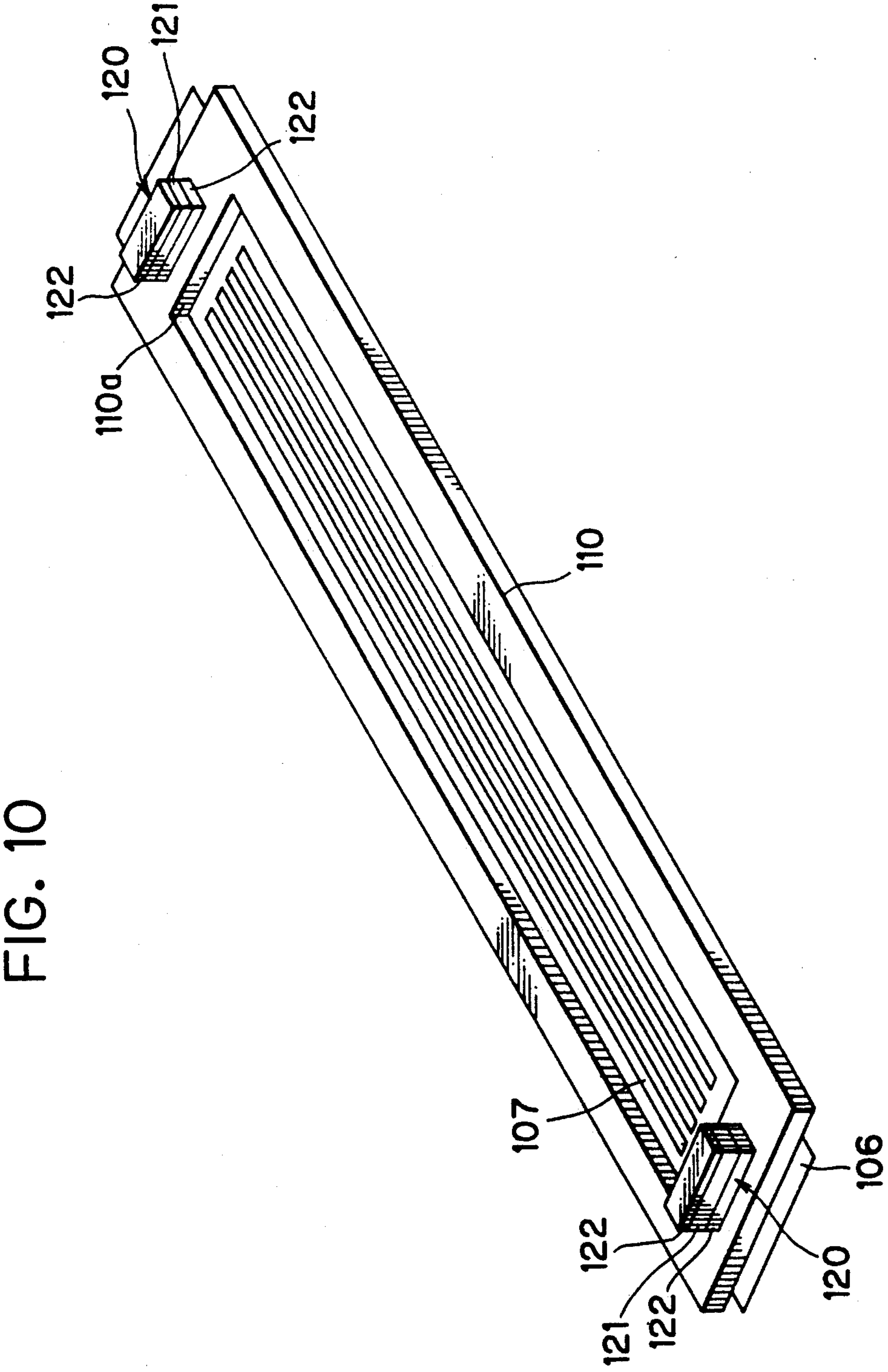
FIG. 10 is a perspective view showing the particle controller and the vibration enhancing plate, with the scanning electrodes of the particle controller facing up.

As shown in FIG. 7, the particle controller 109 having the above-described structure is provided with a vibration enhancing plate 110. The vibration enhancing plate 110 is bonded with adhesive agent to the surface of the central insulative layer 106 confronting the brush roll 3, as illustrated in detail in FIG. 9. As shown in FIG. 10, the vibration enhancing plate 110 is an elongated rectangular frame shape extending in the direction perpendicular to the image receiving medium transfer direction A. The vibration enhancing plate 110 has an elongated through hole 110*a* for allowing the scanning electrodes 107 on the central insulative layer 106 to be exposed to the brush roll 3. The vibration enhancing plate 110 is adapted for enhancing vibration of the particle controller 109.

As shown in FIG. 10, the vibration enhancing plate 110 is provided with a pair of piezoelectric elements 120, on its surface confronting the brush roll 3, at both ends in its longitudinal direction which is perpendicular to the image receiving medium transfer direction A. Each piezoelectric element 120 includes a base plate 121 of piezoelectric ceramics material such as zirconic acid lead titanate (PZT) and a pair of electrodes 122 on both side surfaces of the base plate 121. The electrodes 122 are connected to an A.C. voltage power supply 123 through a vibration driver 124 which are both mounted on the bottom plate 51 of the image recording apparatus housing 52. The vibration driver 124 supplies the piezoelectric element 120 with a voltage sine wave with its frequency being matched with a natural frequency of a system constructed by the vibration enhancing plate 110 and the particle controller 109. Accordingly, the pair of piezoelectric elements 120 cooperate with the vibration enhancing plate 110 to oscillate the particle controller 109.

The particle controller 109 provided with the vibration enhancing plate 110 is installed in the image forming cartridge 20 of the image recording unit 1 in such a manner that edges of the vibration enhancing plate 110 are fixedly attached to inner walls of the image forming cartridge 20.

The electrical connection between the voltage controller C and the scanning electrodes 107 and the data electrodes 108 is achieved through the electrical connection between the electrode units 29 provided on the image forming cartridge 20 and the connector members 30 mounted on the apparatus housing 51. The electrical connection between the piezoelectric elements 120 and the A.C. voltage power supply 123 and the vibration driver 124 is also achieved through the electrical connection between the electrode units 29 and the connector members 30. More specifically to say, the scanning electrodes 107, the data electrodes 108 and the piezoelectric elements 120 are electrically connected to the electrode units 29 through electrical connecting members such as metal strips or wirings provided inside of the cartridge 20. The voltage controller C and the A.C. voltage power supply 123 and the vibration driver 124 are electrically connected to the connector members 30 through the cable members 31. Therefore, through the electrical connection of the electrode units 29 and the connector members 30, the voltage controller C is connected with the electrodes 107 and 108, and the A.C. voltage power supply 123 and the vibration driver 124 are connected to the piezoelectric elements 120.

Except for the above-described elements, elements constructing the image recording apparatus 109 of the second embodiment are the same with the corresponding elements in the first embodiment, both in their structures and in their functions. Therefore, in the description of the second embodiment, explanations of those elements will be omitted for simplicity and clarity.

The image forming apparatus 19 of the second embodiment having the above-described structure is operated, as will be described below.

When the image receiving medium P is inserted into the apparatus 19, the image recording operation is started to be conducted, similarly as in the first embodiment. The imaging material particles T stored in the particle reservoir cartridge 21 are then transferred into the image forming cartridge 20 where the imaging material particles are transferred toward the brush roll 3 while being triboelectrically charged to positive polarity. The imaging material particles are jumped out of the brush roll 3 when the scratching member 10 scratches the ciliary members on the brush roll, so that a mist of the imaging material particles are supplied below the particle controller 109.

The voltage controller C selectively applies the first and second scanning voltages Vs1, Vs2 to the respective scanning electrodes 107 and selectively applies the first and second data voltages Vd1, Vd2 to the respective data electrodes 108, in synchronization with the transferring operation of the image receiving medium P. Accordingly, the particle controller 109 modulates the most of the imaging material particles floating in the space adjacent to the particle controller such that only the apertures on the intersection points o the scanning electrodes 107 supplied with the second scanning voltage Vs2 and the data electrodes 108 supplied with the second data voltage Vd2 may allow the imaging material particles to pass therethrough. The imaging material particles thus having passed the particle controller 109 further fly up in a direction toward the back electrode roll 12 to reach the surface of the image receiving medium P confronting the particle controller 109. The imaging material particles then adhere to the image receiving medium P to form a visible image thereon. Accordingly, the imaging material particles modulated with the particle controller 109 according to the voltage signals from the voltage controller C record the image on the image receiving medium P.

During when the recording operation is being conducted as described above, the A.C. voltage power supply 123 supplies electrical current to the vibration driver 124. Upon the supplied electrical current, the vibration driver 124 induces the pair of piezoelectric elements 120 to vibrate. The vibration is transmitted from the piezoelectric elements 120 to the vibration enhancing plate 110 and to the particle controller 109. Thus, surface waves are generated to be travelled on the surface of the particle controller 109 confronting the brush roll 3 along the longitudinal direction of the particle controller. Since the vibration frequency of the piezoelectric elements 120 is selected to be matched with the natural frequency of the system constructed by the particle controller 109 and the vibration enhancing plate 110, resonance phenomenon is exhibited on the surface of the particle controller 109, and a standing wave oscillation having a large amplitude is generated on the surface of the particle controller 109 confronting the brush roll 3.

Though the mist of the imaging material particles floats in the space adjacent to the surface of the particle controller 109 as described above, since the surface of the particle controller 109 is thus stably oscillated with the large amplitude standing wave oscillation, the imaging material particles may not be attached onto the surface of the particle controller. Even if the imaging material particles are attached onto the surface of the particle controller 109, the particle controller 109 immediately shakes the imaging material particles away from the surface thereof. Accordingly, the imaging material particles ar prevented from being adhered to the particle controller surface and from accumulating thereon, so that the apertures 105 are prevented from being clogged with the imaging material particles. The particle controller 109 of the second embodiment is thus free from the imaging material particle clogging defects, and therefore can stably supply the image receiving medium P with the desired constant amount of imaging material particles.

The image receiving medium P with its surface being formed with the visible image is then discharged out of the image recording unit 1 and is transferred to the image fixing portion 2 where the image is thermally fixed on to the image receiving medium P, similarly as in the first embodiment.

In order to actually implement the above-described image recording apparatus 109 of the present embodiment, for example, the central insulative layer 106 may be formed of a thin layer of polyimide with its thickness being in a range of about 25 to 50 micrometers. The scanning electrodes 107 and the data electrodes 108 may be formed on the insulative layer through a print process or other various types of thin film formation process. The apertures 105 may be formed to have a fixed diameter of 50 micrometers and to be arranged in one line on each scanning electrode 107 with a fixed interval of 85 micrometers, in order to record an image of a density of 300 [dpi] (dots per inch) on the image receiving medium P. The used imaging material particles may be such as polymerized toners with their diameters being equal to or smaller than 5 micrometers.

The vibration enhancing plate 110 may be formed of metal such as stainless steel, and may have a thickness of equal to or smaller than 1 millimeter. The vibration enhancing plate 110 may be bonded with epoxy adhesive agent to the central insulative layer 106. The vibration enhancing plate 110 can therefore enhance vibration of the particle controller 109 formed of polyimide which is difficult to be vibrated.

The particle controller 109 and the vibration enhancing plate 110 may be installed in the image forming cartridge 20 in such a manner that the edges of the vibration enhancing plate 110 are attached to inner walls of the image forming cartridge 20 with epoxy adhesive agent or through welding process or deposition process. It is noted that the edges of the vibration enhancing plate 110 should not be attached to the cartridge inner walls with screws, since the screws fail to maintain the vibration state of the vibration enhancing plate to be unchanged.

The voltage sine wave supplied to the piezoelectric elements 120 may have an amplitude of several tens voltages and may have ultrasonic frequency of 46.54 kilohertz which corresponds to the natural frequency of the system constructed by the particle controller 109 and the vibration enhancing plate 110. In this case, the obtained amplitude of the standing wave oscillation of the particle controller 109 is about 0.2 micrometers.

The first and second scanning voltages Vs1 and Vs2 may be selected to −100 [V] and −60 [V], respectively, and the first and second data voltages Vd1 and Vd2 may be selected to −40 [V] and −80 [V], respectively.

As described above, according to the second embodiment, since the particle controller is operated to vibrate mechanically, the imaging material particles do not adhere to the particle apertures. Even if the imaging material particles adhere to the apertures, the imaging material particles are removed at once by such vibration. Accordingly, it becomes possible to prevent clogging of the apertures with the imaging material particles from being occurred which may be possibly occurred in accordance with the particle controller environment changes, dust, moisture or the like. Therefore, it is possible to reliably obtain a beautiful output image.

The natural frequency of the system constructed by the particle controller 109 and the vibration enhancing plate 110 depends not only on the materials and the structures of the particle controller 109 and the vibration enhancing plate 110 but also on the states how the vibration enhancing plate is bonded to the central insulative layer 106 and how the vibration enhancing plate is attached to the cartridge inner walls. Therefore, in case that the vibration enhancing plate 110 fails to be fixedly bonded to the insulative layer 106 or if the vibration enhancing plate fails to be securely attached to the cartridge 20, the resonance performance may not be exhibited on the particle controller 109, but the particle controller 109 may not be oscillated stably.

According to the present invention, however, the particle controller 109 and the vibration enhancing plate 110 are installed in the image forming cartridge 20 of the image recording unit 1. In the case where the operator of the image recording apparatus 19 desires to repair the particle controller 109 or to replace it with a new one, the operator simply replaces the image recording unit 1 or the image forming cartridge 20 with a new one. Accordingly, such a case may not occur that the operator repairs the particle controller or replaces it with a new one but fails to fixedly attach the vibration enhancing plate 110 to the insulative layer 106 or to the cartridge 20. Therefore, according to the present invention, the particle controller 109 can reliably exhibit its resonance phenomenon, regardless of the replacements of the particle controller which are periodically conducted in the form of the replacement of the image recording unit 1 or the image forming cartridge 20.

Though the present embodiment employs the combination of the scanning electrodes 107 and the data electrodes 108 as described above, the embodiment may employ the combination of the reference electrode 7 and the segment electrodes 8 as described in the first embodiment.

Though the piezoelectric element is used in the above description, mechanical vibration applying means can also be used.

The vibration can be applied continuously or noncontinuously, or vibration can be applied at a time when printing is no being performed.

While only two exemplary embodiments of this invention have been described in detail, those skilled in the art will recognize that there are many possible modifications and variations which may be made in this exemplary embodiment while yet retaining many of the novel features and advantages of the invention. Accordingly, all such modifications and variations are intended to be included within the scope of the appended claims.

What is claimed is:

1. An image recording apparatus for recording an image on an image receiving medium, comprising:

storing means for storing toner particles;

charging means for electrostatically charging the toner particles;

toner mist producing means for receiving the electrostatically charged toner particles from said charging means and producing a mist of the electrostatically-charged toner particles;

a particle controller having at least one row of apertures for selectively allowing the mist of electrostatically-charged toner particles to pass through the apertures; and a back electrode confronting said particle controller for electrostatically attracting the mist of electrostatically-charged toner particles that passed through the apertures of said particle controller;

wherein at least said charging means, said toner mist producing means and said particle controller are formed in an image recording cartridge and wherein said image recording cartridge and said back electrode constitute a unit for defining a conveying passage of the image receiving medium at a position located between said particle controller and said back electrode and apart from said particle controller by a predetermined distance to thereby allow the image receiving medium to be conveyed along the conveying passage so that the mist of electrostatically-charged toner particles that passed through the apertures of said particle controller and were attracted toward said back electrode roller may be attached to the image receiving medium to thereby form a toner image thereon, said unit being detachably mounted in a shouting of said apparatus.

2. The image recording apparatus according to claim 1, wherein said storing means is detachably engaged with said image recording cartridge.

3. The image recording apparatus according to claim 1, wherein said back electrode is detachably engaged with said image recording cartridge.

4. The image recording apparatus according to claim 2, wherein said storing means has a first opening portion for supplying said toner particles to said image recording cartridge when said storing means is engaged with said image recording cartridge.

5. The image recording apparatus according to claim 4, wherein said storing means further comprises a sealing member for covering said first opening portion to prevent said toner particles from being spilled out of said storing means before said storing means is engaged with said image recording cartridge, said sealing member being removed from said first opening portion after said storing means has been engaged with said image recording cartridge.

6. The image recording apparatus according to claim 5, wherein said image recording cartridge has a second opening portion for receiving said toner particles from said storing means, said second opening portion being associated with said first opening portion when said storing means is engaged with said image recording cartridge.

7. The image recording apparatus according to claim 6, wherein said image recording cartridge further comprises a plate member capable of covering a lower part of said second opening portion to prevent said toner particles from being spilled out of said unit before said storing means is engaged with said image recording cartridge, said plate member being moved away from said lower part of said second opening portion so that said toner particles may be supplied from said storing means to said image recording cartridge when said sorting means is engaged with said image recording cartridge.

8. The image recording apparatus according to claim 3, wherein said particle controller comprises:

an insulative layer;

a reference electrode on one of opposite surfaces of said insulative layer; and a plurality of segment control electrodes on the other surface of said insulative layer, each of said apertures passing through corresponding one of said segment control electrodes, said insulative layer and said reference electrode.

9. The image recording apparatus according to claim 8, wherein said image recording cartridge comprises:

an outer wall accommodating therein said at least charging means, toner mist producing means and particle controller; and an electrode unit provided on the outer wall of said image recording cartridge, said electrode unit having a plurality of list connectors, each of said first connectors being connected with said toner mist producing means, said reference electrode, said segment control electrodes and said back electrode, respectively.

10. The image recording apparatus according to claim 9, wherein said housing has a locking member for locking said image recording cartridge on said housing.

11. The image recording apparatus according to claim 10, wherein said locking member comprises:

a support plate fixedly mounted in the housing of said apparatus at such a position that the support plate may be contacted with the outer wall of said image recording cartridge mounted in the housing of said apparatus; and a plurality of second connectors provided on said support plate, said second connectors being slidably moved on said support plate to be connectable with the first connectors of the electrode unit provided on the outer wall of said image recording cartridge contacted with said support plate, at least one of said second connectors being grounded, the rest of said connectors being connected with a plurality of direct current power supplies and a plurality of signal sources.

12. The image recording apparatus according to claim 11, wherein said first and second connectors grounds said toner mist producing means, connects said reference electrode to a first direct current power supply, connects said back electrode to a second direct current power supply having a voltage higher than that of said first direct current power supply, and individually connects said segment control electrodes to said plurality of signal sources.

13. The image recording apparatus according to claim 3, further comprising positioning means for positioning said image recording cartridge and said back electrode in the unit so that said back electrode may be located apart from said particle controller by a space defining the conveying passage between said particle controller and said back electrode.

14. The image recording apparatus according to claim 13, further comprising:

a cartridge housing wall for defining a cartridge housing for accommodating therein said charging means, said toner mist producing means, and said particle controller; the cartridge housing wall having first connecting means; and a back electrode housing wall for defining a back electrode housing for accommodating therein said back electrode, the back electrode housing wall having second connecting means;

wherein said first and second connecting means are connectable with each other so as to combine said cartridge housing and said back electrode housing into said unit so that said back electrode accommodated in said back electrode housing may be located apart from said particle controller accommodated in said cartridge housing by a space defining the conveying passage between said particle controller and said back electrode.

15. The image recording apparatus according to claim 14, wherein said cartridge housing wall includes first and second wall sections and said back electrode housing wall includes third and fourth wall sections, said first and second connecting means being connectable with each other so as to allow said first and third wall sections to define an insert opening for introducing the image receiving medium into the unit and so as to allow said second and fourth wall sections to define a discharge-out opening for discharging the image receiving medium out of the unit, the insert opening and the discharge-out opening defining the conveying passage.

16. The image recording apparatus according to claim 15, wherein said back electrode includes a back electrode roll for conveying the image receiving medium, said first and second connecting means being connectable so as to combine said cartridge housing and said back electrode housing so that said back electrode roll is located at a position spaced from said particle controller accommodated in said cartridge housing by the predetermined distance so that said back electrode roll may convey the image receiving medium at a position apart from said particle controller by the predetermined distance.

17. An image recording apparatus according to claim 1, wherein said toner mist producing means includes:

a cylindrically-shaped brush roll having a peripheral surface rotatable about an axis, the axis extending in parallel to the row of apertures, a plurality of ciliary members formed of elastic material implanted on the peripheral surface said charging means supplies the electrostatically-charged toner particles onto the peripheral surface among the plurality of ciliary members; and a scratching member for elastically deforming the ciliary members so that the toner particles may jump out of the ciliary members to fly up into a space adjacent of the apertures of said particle controller when the deformed elastic ciliary members are relaxes.

18. An image recording cartridge for use in an image recording apparatus for recording an image on an image receiving medium, comprising:

charging means for electrostatically charging toner particles;

toner mist producing means for receiving the electrostatically-charged toner particles from said charging means and producing a mist of the electrostatically-charged toner particles;

a particle controller having at least one row of apertures for selectively allowing the mist of electrostatically-charged toner particles to pass through the apertures; and conveying passage defining means for defining a conveying passage of the image receiving medium at a position apart from said particle controller by a predetermined distance, the image receiving medium being conveyed along the conveying passage so that the mist of electrostatically-charged toner particles that passed through the aperture of said particle controller attach to the image receiving medium to form a toner image thereon;

wherein said image recording cartridge is detachably mounted in a housing of said image recording apparatus.

19. The image recording cartridge according to claim 18, wherein storing means for storing the toner particles is detachably engaged with said cartridge.

20. The image recording cartridge according to claim 18, wherein a back electrode is detachably engaged with said image recording cartridge such that said back electrode may confront said particle controller for electrostatically attracting the mist of electrostatically-charged toner particles that passed through the apertures of said particle controller, the toner of said mist being attached to the image receiving medium to form the toner image thereon, wherein said conveying passage defining means includes positioning means for positioning said back electrode from said particle controller by said predetermined distance.

21. The image recording cartridge according to claim 20, further comprising an electrode unit connected with said particle controller, said electrode unit being connectable with a plurality of signal sources provided in a housing of the image recording apparatus.

22. An image recording cartridge according to claim 21, wherein said charging means includes a cylindrically-shaped charging roll having a peripheral surface and an axis rotatable thereabout, the charging roll triboelectrically charging the toner particles with friction between the particles and the peripheral surface of the charging roll.

23. The image recording apparatus according to claim 1, further comprising vibration applying means for vibrating said particle controller to thereby prevent the charged toner particles from being attached to said particle controller.

24. The image recording apparatus according to claim 23, wherein said vibration applying means is provided on said particle controller.

25. The image recording apparatus according to claim 24, wherein said vibration applying means includes a vibration enhancing plate attached to said particle controller and a vibration member mounted on said vibration enhancing plate.

26. The image recording apparatus according to claim 25, wherein said vibration member includes a piezoelectric member.

27. The image recording apparatus according to claim 26, wherein said particle controller includes:

an insulative layer;

a plurality of first electrodes arranged on one of opposite surfaces of the insulative layer, each of the first electrodes extending in a first direction; and a plurality of second electrodes arranged on the other one of the opposite surfaces of the insulative layer, each of the second electrodes extending in a second direction, the second direction being inclined with respect to the first direction, wherein each of the apertures passes through a corresponding one of said first electrodes, a corresponding one of said second electrodes and the insulative layer.

28. The image recording cartridge according to claim 18, further comprising vibration applying means for vibrating said particle controller to thereby prevent the charged toner particles from being attached to said particle controller.

29. The image recording cartridge according to claim 28, wherein said vibration applying means is provided on said particle controller.

30. The image recording cartridge according to claim 29, wherein said vibration applying means includes a vibration enhancing plate attached to said particle controller and a vibration member mounted on said vibration enhancing plate.

31. The image recording cartridge according to claim 30, further comprising a cartridge housing for accommodating therein said charging means, said particle controller and said toner mist producing means, said cartridge housing having a housing inner wall, and wherein said particle controller is provided within said cartridge housing in such a manner that said vibration enhancing plate is partly attached to the housing inner wall.

32. The image recording cartridge according to claim 31, wherein said vibration member includes a piezoelectric member.

33. The image recording cartridge according to claim 32 wherein said particle controller includes:

an insulative layer;

a plurality of first electrodes arranged on one of opposite surfaces of the insulative layer, each of the first electrodes extending in a first direction; and a plurality of second electrodes arranged on the other one of the opposite surfaces of the insulative layer, each of the second electrodes extending in a second direction, the second direction being inclined with respect to the first direction, wherein each of the apertures passes through a corresponding one of said first electrodes, a corresponding one of said second electrodes and the insulative layer.

34. The image recording cartridge according to claim 18, further comprising a cartridge housing wall for defining a cartridge housing for accommodating therein said charging means, said toner mist producing means, and said particle controller, wherein said conveying passage defining means includes a first wall section formed on said cartridge housing wall for defining an insert opening for introducing the image receiving medium into the image receiving cartridge and a second wall section formed on said cartridge housing wall for defining a discharge opening for discharging the image receiving medium out of the image receiving cartridge.

35. The image recording cartridge according to claim 18, wherein said toner mist producing means includes:

a cylindrically-shaped brush roll having a peripheral surface rotatable about an axis, the axis extending in parallel to the row of the apertures, a plurally of ciliary members formed of elastic material implanted on the spherical surface, said charging means supplies the electrostatically-charged toner particles onto the peripheral surface among the plurality of ciliary members; and a scratching member for elastically deforming the ciliary members so that the toner particles may pump out of the ciliary members to fly up into a space area adjacent to the apertures of said particle controller when the deformed elastic ciliary members are relaxes.

36. The image recording cartridge according to claim 18, wherein said conveying passage defining means includes a back electrode roll located to confront said particle controller for electrostatically attracting the mist of electrostatically-charged toner particles that passed through apertures of said particle controller, said back electrode roll being spaced from said particle controller by the predetermined distance, said back electrode roll conveying the image receiving medium to a position confronting said particle controller and apart from said particle controller by the predetermined distances, the mist of electrostatically-charged toner particles having passed through the aperture of said particle controller and attracted toward said back electrode roll being attached to the image receiving medium to form the toner image thereon.

37. The image recording cartridge according to claim 20, wherein said back electrode includes a back electrode roll for conveying the image receiving medium, and wherein said positioning means positions said back electrode roll at a position spaced from said particle controller by the predetermined distance so that said back electrode roll may convey the image receiving medium to a position apart from said particle controller by the predetermined distance.

38. An image recording apparatus for recording an image on an image receiving medium, comprising:

storing means for storing toner particles;

charging means for electrostatically charging the toner particles;

toner mist producing means for receiving the electrostatically charged toner particles from said charging means ad producing a mist of the electrostatically-charged toner particles;

a particle controller having at least on row of apertures for selectively allowing the mist of electrostatically-charged toner particles to pass through the apertures;

a back electrode located to confront said particle controller or electrostatically attracting the mist of electrostatically-charged toner particles that passed through the aperture of said particle controller; and vibration applying means for vibrating said particle controlled to thereby prevent the charged toner particles from being attached to said particle controller;

wherein at least said charging means, said toner mist producing means, said particle controller and said vibration applying means are formed in an image recording cartridge; and wherein said image recording cartridge and said back electrode constitutes a unit for defining a conveying passage of the image receiving medium at a position located between said particle controller and said back electrode and apart from said particle controller by a predetermined distance to thereby allow the image receiving medium to be conveyed along the conveying passage so that the mist of electrostatically-charged toner particles having passed through the aperture of said particle controller and attracted toward said back electrode roller may be attached to the image receiving medium to thereby form a toner image thereon, said unit being detachably mounted in a housing of said apparatus.

39. An image recording cartridge for use in an image recording apparatus for recording an image on an image receiving medium, comprising:

charging means for electrostatically charging toner particles;

toner mist producing means of receiving the electrostatically-charged toner particles from said charging means and producing a mist of the electrostatically-charged toner particles;

a particle controller having at least one row of apertures for selectively allowing the mist of electrostatically-charged toner particles to pass through the apertures;

vibration applying means for vibrating said particle controlled to they prevent the charged toner particles from being attached to said particle controller; and conveying passage defining means for defining a conveying passage of the image receiving medium at a position apart from said particle controller by a predetermined distance, the image receiving medium being conveyed along the conveying passage so that the mist of electrostatically-charged toner particles having passed through the aperture of said particle controller may be attached of the image receiving medium to form a toner image thereon;

wherein said image recording cartridge is detachably mounted in a housing of said image recording apparatus.

* * * * *